United States Patent
Trivedi

(10) Patent No.: US 7,297,748 B2
(45) Date of Patent: Nov. 20, 2007

(54) DIRECT TO METAL POLYURETHANE COATING COMPOSITIONS

(75) Inventor: Satyen Trivedi, East Windsor, NJ (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 11/215,607

(22) Filed: Aug. 30, 2005

(65) Prior Publication Data

US 2006/0047085 A1    Mar. 2, 2006

Related U.S. Application Data

(60) Provisional application No. 60/605,928, filed on Aug. 31, 2004.

(51) Int. Cl.
*C08F 230/02* (2006.01)
*C08F 30/02* (2006.01)
*C08J 3/24* (2006.01)

(52) U.S. Cl. .................. 525/326.6; 525/244; 525/259; 525/262; 525/287; 525/330.3; 525/340; 525/330.5; 525/374; 525/379; 525/383; 525/386; 525/538; 526/274

(58) Field of Classification Search ................ 525/244, 525/259, 262, 287, 330.3, 340, 330.5, 326.6, 525/374, 379, 383, 386, 538; 526/274
See application file for complete search history.

(56) References Cited

U.S. PATENT DOCUMENTS

| | | | |
|---|---|---|---|
| 3,855,364 A | 12/1974 | Steckler | |
| 4,071,508 A * | 1/1978 | Steckler | ...................... 526/287 |
| 6,534,597 B2 * | 3/2003 | Adam et al. | ................ 525/340 |

* cited by examiner

*Primary Examiner*—Roberto Rabago

(57) ABSTRACT

The invention is directed to a direct to metal coating composition containing an acrylic polyol synthesized with a phosphated monomer having improved adhesion and corrosion resistance characteristics. The invention is also directed to a method for producing a direct to metal coating composition containing an acrylic polyol synthesized with a phosphated monomer on a substrate by applying the coating composition of the invention to a metal surface. The invention is further directed to an acrylic polyol synthesized with a phosphated monomer coated article having improved adhesion and corrosion resistance characteristics.

42 Claims, No Drawings

DIRECT TO METAL POLYURETHANE COATING COMPOSITIONS

This patent application claims priority from provisional patent application Ser. No. 60/605,928, filed Aug. 31, 2004.

FIELD OF THE INVENTION

The invention relates generally to coating compositions which can be applied directly to metal as a primer, single stage top coat, clear coat or self-priming topcoat. More particularly, the invention relates to direct to metal polyurethane primer compositions having improved coating characteristics including, adhesion, water resistance, humidity resistance, exterior weathering durability and corrosion resistance.

BACKGROUND OF THE INVENTION

Various surfaces, particularly metal surfaces, require a protective coating especially when the surface will be prone to corrosive environment exposure. Metal surfaces for use in a wide variety of industries, for example, automotive, agricultural, aircraft, construction, and industrial, are particularly prone to corrosion and require protection against corrosive environments. It is important therefore that coatings for metal surfaces are resistant to various chemicals, water, and the weather. It is equally important that these coatings have excellent adhesion characteristics.

Metal surfaces have traditionally been coated with high performance two-component protective coating compositions consisting of an epoxy primer and a polyurethane topcoat. The epoxy primers are used to provide adherence to the metal surface and to adhere to the topcoat while preventing corrosion. However, most conventional two-component primer compositions have shown lack luster adhesion and corrosion resistance performance, particularly when used on refinished surfaces or metals surfaces treated with a zinc containing material (e.g., galvanized). Refinished metal surfaces are generally those which have undergone sanding or grinding, which typically results in the bare metal surface being exposed. Examples of commonly encountered refinished metal surfaces include metal aluminum, galvanized steel, and cold rolled steel. Bare metal is often exposed as a result of the removal of the previously applied coating layers containing and/or surrounding the defect area. It is often difficult to obtain adequate adhesion of coatings applied directly to exposed metal surfaces and exposed refinished metal surfaces.

Accordingly, there exists a need in the art for an improved coating compositions having improved adhesion to metal surfaces (including galvanized metal surfaces and bare metal surfaces), corrosion resistance, exterior weathering durability, and water/humidity resistance.

SUMMARY OF THE INVENTION

The invention is directed to a direct to metal coating composition having improved adhesion and improved corrosion resistance characteristics. The direct to metal coating composition comprises a film-forming polymer, a high monoester content polyalkylene oxide (meth)acrylate polymerizable phosphate ester, and a cross-linking agent. The phosphate ester is preferably a polymerizable adhesion promoter, or a salt thereof, having the formula:

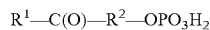

wherein $R^1$ is an optionally substituted vinyl radical, $R^2$ is a divalent polyoxyalkylene radical, for example, oxypropylene or oxyethylene units, or a polyoxyalkylene in a block or random pattern, and wherein in the ester the mono-phosphate ester to di-phosphate ester weight ratio is greater than 80:20.

The invention is further directed to a two component coating composition comprising a film-forming component and a cross-linking component. The firm-forming component comprises a polymer synthesized with a high monoester content polyalkylene oxide (meth)acrylate polymerizable phosphate ester. The cross-linking component is preferably a polyisocyanate.

A further aspect of the invention comprises a method for improving corrosion resistance in a coating system, comprising the steps of applying the aforedescribed compositions to a metal surface.

Yet another aspect of the invention is a method of making the aforedescribed compositions.

DETAILED DESCRIPTION OF INVENTION AND PREFERRED EMBODIMENTS

"Galvanized iron or steel" as used herein refers to iron or steel coated with zinc.

"High monoester content" as used herein refers to a mono-phosphate ester to di-phosphate ester weight ratio greater than 80:20.

"Metal" as used herein refers to metals such as Aluminum, manganese, nickel, chromium, molybdenum, vanadium, tungsten and cobalt.

"Phosphated steel" as used herein refers to iron phosphated steel or zinc phosphated steel.

"Steel" as used herein refers includes, but is not limited to, cold rolled steel, alloys of iron with carbon or metals such as manganese, nickel, copper, chromium, molybdenum, vanadium, tungsten and cobalt.

"Two-component" refers to the number of solutions and/or dispersions, which are mixed together to provide a curable coating composition. Up to the point of mixing, neither of the individual components alone provides such a curable coating composition.

With the use of a high monoester content polyalkylene oxide (meth)acrylate polymerizable phosphate ester (hereinafter "phosphated monomers"), the invention provides a coating composition with improved coating properties, particularly adhesion, water resistance, humidity resistance, exterior weathering durability and corrosion resistance to metal surfaces. Incorporating phosphated monoesters into a direct to metal coating composition provides improved adhesion when applied directly over metal substrates, especially untreated metal substrates such as galvanized iron or steel, unsanded aluminum, and unsanded cold-rolled steel.

The phosphated monomers for use in the invention are described in U.S. Pat. No. 6,534,597, which is herein incorporated by reference. The phosphated monomers are preferably a polymerizable adhesion promoter, or a salt thereof, having the formula:

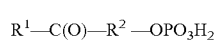

wherein:

$R^1$ is an optionally substituted vinyl radical, preferably $CH_2=CH—$, $CH_2=C(CH_3)—$, or cis-$CH(COOH)=CH—$; and $R^2$ is a divalent polyoxyalkylene radical having at least two oxyalkylene units, preferably about 2 to about 50 oxyalkylene units, more typically about 2 to about 20 oxyalkylene units, e.g. $(O—CH_2CH_2)n$ or $(O—CH_2CH(CH_3))_n$ wherein n is from about 2 to about 50, wherein in the ester the mono-phosphate ester to di-phosphate ester weight ratio is greater than 80:20.

The polyoxyalkylene unit can be derived from a variety of epoxyalkane compounds including ethylene oxide, propylene oxide, butylene oxide, styrene oxide, other alkyl, cycloalkyl or aryl substituted alkyl oxides or alkyl or aryl glycidyl ethers. It may additionally include hydrocarbon chain segments such as might be derived from ring opening of caprolactone by 2-hydroxyethyl methacrylate.

In an embodiment of the invention $R^1$ is selected from the group consisting of $CH_2=CH—$, $CH_2=C(CH_3)—$, or cis-$CH(COOH)=CH—$.

In another embodiment $R^2$ has about 2 to about 50 oxypropylene units.

In yet another embodiment $R^2$ has about 2 to about 20 oxypropylene units.

In still another embodiment the molar ratio of oxypropylene units to oxyethylene units is at least 3:1.

In still yet another embodiment the molar ratio of oxypropylene units to oxyethylene units is at least 4:1.

In another embodiment the molar ratio of oxypropylene units to oxyethylene units is at least 5:1.

A commercially available and most preferred example of the phosphated monomers of the invention is PAM 200, commercially available from Rhodia Inc., of Cranbury, N.J., U.S.A.

The phosphated monomers of the invention may be incorporated into finished coating compositions by any suitable manner. Preferably a film-forming polymer, for example, acrylic polyol, is synthesized with the phosphated monomer in a heated reactor. Suitable reactor temperatures are at least about 100° C. and preferable about 122° C. Any suitable reaction time may be used, with a reaction time of about 3 hours being preferred.

It should also be understood that although the phosphate ester may be used in single or two component systems, use in two-component systems is preferred, and it is even more preferred that the phosphated monomer is placed in the film-forming or resin component of a two component system. The film-forming component containing phosphated monomers can be used to create a hybrid system by adding additional film-forming polymers to the film-forming component. Suitable film-forming polymers include polyester, acrylic polymers, alkyds, polyurethane polymers, polyamides, epoxy group containing polymers, and the like. Suitable one component systems include blocked polyisocyanates for polyurethane system, acrylic-melamine, polyester-melamine, or alkyd systems.

Once mixed, the resulting curable coating composition may be applied to a metal surface. Preferably, the resulting coating composition is applied to the metal surface relatively fast. Typically, "relatively fast" means immediately after the mixing of the separate components up to within eight (8) hours from the time the separate components are mixed, and preferably less than one (1) hour after the separate components are mixed.

In conventional automotive refinish or similar applications, thermoset coating compositions comprise two components stored in separate containers. These containers are typically sealed to increase the shelf life of the components of the coating composition. The components are then mixed prior to use to form a pot mix. Conventional pot mixes have a limited shelf life referred to as "pot life". The pot mix is generally applied by spray application as a layer of desired thickness on a substrate surface for example an auto-body or appropriate substrate. Typically the pot mix is applied via a spray nozzle. After application, the layer is cured under ambient conditions or bake cured at elevated temperatures to form a coating on the substrate surface having desired coating properties, such as adhesion, gloss, hardness, chemical resistance, humidity resistance, salt spray resistance, etc.

Generally, in a industrial two-component coating application process, the components are mixed together either (i) at the nozzle of a sprayer by the joining of two separate carrier lines at the nozzle or (ii) immediately upstream of the nozzle of a sprayer and then delivered to the nozzle via a single carrier line. Once at the nozzle, the mixture is immediately atomized into a mist that is directed at a substrate, which is being coated with the two-component coating composition.

Two-component compositions, in contrast to one-component compositions, will generally cure in the absence of elevated temperatures. For example, the film-forming component and cross-linking component will generally react with each other upon mixing to provide a cross-linked product, most often at ambient temperatures, or more particularly at temperatures of from about 15° C. to about 60° C., and most preferably from about 24° C. to about 60° C.

A two component coating composition of the present invention includes (I) a film-forming component, having a high monoester content polyalkylene oxide (meth)acrylate polymerizable phosphate ester incorporated or mixed with a film-forming polymer, and (II) a cross-linking component comprising a cross-linking agent.

The film-forming polymer may contain any functional group reactive with the functional group present on the cross-linking agent, preferably the functional group present on the film-forming polymer is at least one functional group selected from the group consisting of hydroxyl, amine, carboxylic acid, epoxy, and mixtures thereof. Especially preferred functional groups for use on the film-forming polymer are hydroxyl groups and amine groups, with hydroxyl groups being most preferred.

Examples of suitable film-forming polymers are acrylic polymers, polyurethane polymers, polyesters, alkyds, polyamides, epoxy group containing polymers, and the like.

Particularly preferred film-forming polymers are difunctional, generally having an average functionality of about two to eight, and preferably about two to four. These compounds generally have an average molecular weight of from about 400 to about 10,000, and preferably from about 400 to about 8,000. However, it is also possible to use low molecular weight compounds having molecular weights below about 400. It should be noted that the compounds used as film-forming polymers should not be volatile under the heating conditions, if any heat is used to cure the compositions.

More preferred compounds containing reactive hydrogen groups are the known polyester polyols, polyether polyols, polyhydroxyl polyacrylates, polycarbonates containing hydroxyl groups, and mixtures thereof. In addition to these preferred polyhydroxyl compounds, it is also possible to use polyhydroxy polyacetals, polyhydroxy polyester amides, polythioether containing terminal hydroxyl groups or sulphydryl groups or at least difunctional compounds containing amino groups, thiol groups or carboxy groups. Mixtures of the compounds containing reactive hydrogen groups may also be used.

In a preferred embodiment of the invention, the film-forming polymer is an acrylic resin, which may be a polymer or oligomer. The acrylic polymer or oligomer preferably has a number average molecular weight of 500 to 1,000,000, and more preferably of 1,000 to 20,000. Acrylic polymers and oligomers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such resins include hydroxyethyl acrylate, hydroxybutyl acrylate, hydroxybutyl methacrylate, hydroxypropyl acrylate, and the like. Amino-functional acrylic monomers include t-butylaminoethyl methacrylate and t-butylamino-ethylacrylate. Other acrylic monomers having active hydrogen functional groups in the ester portion of the monomer are also within the skill of the art.

Modified acrylics are also suitable film-forming polymers. Such acrylics may be polyester-modified acrylics or polyurethane-modified acrylics, as is well-known in the art. Polyester-modified acrylics modified with e-prolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Polyesters having active hydrogen groups such as hydroxyl groups can also be used as the film-forming polymer in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well-known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Although polymeric or oligomeric active hydrogen components are often preferred, lower molecular weight non-polymeric active hydrogen components may also be used in some applications, for example aliphatic polyols (e.g., 1,6-hexane diol), hydroxylamines (e.g., monobutanolamine), and the like.

In accordance with a most preferred embodiment of the invention, an acrylic polyol is synthesized with the phosphated monomers of the invention, to form the film-forming component of a two-component system. Preferably, the acrylic polyol is synthesized with from about 0.5% to about 10% by weight ("% by wt.") phosphated monomers. Most preferably the acrylic polyol is synthesized with about 4% by wt. phosphated monomers.

In a two-component system the acrylic polyol may function as a film-forming polymer. However, the film-forming component of a two-component system in accordance with the invention may also comprise additional film-forming polymers. The film-forming polymer will generally comprise at least one functional group selected from the group consisting of active hydrogen containing groups, epoxide groups, and mixtures thereof. The functional group is preferably reactive with one or more functional groups of the cross-linking agent.

Examples of functional group combinations useful for the production of cross-linked coatings include, but are not limited to, active-hydrogen and isocyanate, epoxide and carboxylic acid, hydroxyl/carboxylic acid and/or urea-formaldehyde/melamine-formaldehyde, epoxide and amine, and the like.

Examples of suitable cross-linking agents include those compounds having one or more functional groups reactive with the functional groups of the film-forming polymer. Examples of suitable cross-linking agents include isocyanate functional compounds and aminoplast resins, epoxy functional compounds, acid functional compounds and the like. Preferably, the cross-linking agent has functional groups selected from the group consisting of isocyanate groups and amine groups. Most preferred cross-linking agents for use in the coating compositions of the invention are isocyanate functional compounds.

Suitable isocyanate functional compounds include polyisocyanates which are aliphatic (including cycloaliphatic polyisocyanates) or aromatic. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic diisocyanates include the various isomers of toluene diisocyanate, meta-xylenediisocyanate and para-xylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used.

In a most preferred embodiment, the cross-linking agent will comprise one or more components selected from the group consisting of hexamethylene diisocyanate trimer (HDT), the isocyanurates of HDT, the biurets of HDT, and mixtures thereof, with the isocyanurates and biurets of HDT being particularly preferred. Suitable mixtures include, HDT and Isophorone diisocyanate trimer (IPDT) and/or blends of biuret of hexamethylene diisocyanate (HDB) and IPDT.

Suitable isocyanate functional compounds may be unblocked, in which case the coating composition should be utilized as a two component system, i.e., the reactive components combined relatively fast before application, or they may be blocked. Blocked systems are most preferred with higher temperature applications. Any known blocking agents, such as alcohols or oximes, may be used.

In a most preferred embodiment of the coating compositions of the invention, the coating composition will be a two-component system with the reactive film-forming polymer and the cross-linking agent combined relatively shortly before application. In such an embodiment, the composition of the invention comprising the film-forming polymer synthesized with the phosphated monomers will preferably be incorporated into the film-forming component of the two-component system.

The components of the two-component system may also comprise one or more solvents. A solvent or a blend of solvents is generally used to reduce the coating composition to an optimum spray viscosity. In a preferred embodiment, the film-forming component will include one or more solvents. Suitable solvents and/or diluents include benzene, toluene, xylene, and aromatic naphtha. Ester solvents include ethyl acetate, butyl acetate, cellosolve, hexyl acetate, amyl acetate, ethyl proprionate, butyl proprionate, etc. Ketone solvents include acetone, methyl amyl ketone, diisobutyl ketone, methyl ethyl ketone, methyl isopropyl ketone, methyl isobutyl ketone, diethyl ketone, and cyclohexanone, and mixtures thereof. Glycol ester solvents may include ethylene glycol, monoethyl ether acetate, etc. The film-forming component preferably comprises ketones, and more preferably comprise methyl amyl ketone, methyl isobutyl ketones, or mixtures thereof. The cross-linking component preferably comprises butyl acetate, high flash aromatic solvent mixtures, or mixtures thereof.

The coating compositions of the present invention are generally organic solvent based, but they may also be water based. An amine may be used to neutralize the carboxyl groups to form a dispersion of the polymer in water. Useful amines include dialkanolamines, alkylalkanolamines, and arylalkanolamines containing from 2 to 18 carbon atoms in the alkanol, alkyl, and aryl chains. Specific examples include N-ethylethanolamine, N-methylethanolamine, diethanolamine, N-phenylethanolamine and diisopropanolamine.

The coating composition can optionally contain ultraviolet light stabilizers, antioxidants, catalysts, wetting and dispersing agents e.g. carboxylic acid salts of polyamine amides, flow modifiers e.g. polyether modified methylalkyl polysiloxane copolymer, adhesion promoters, pigments, dyes, leveling agents, corrosion inhibitors, etc. Suitable pigments include, but are not limited to, synthetic silicone dioxide calcium-ion exchanged, aluminum triphosphate, ztrontium zinc phosphosilicate, zinc phosphate, zinc oxide, zinc molybdate, zinc phospho-molybdate, calcium zinc molybdate, and calcium zinc phospho-molybdate, zinc aluminum orthophosphate hydrate, zinc orthophosphate hydrate, zinc molybdenum orthophosphate hydrate, zinc calcium aluminum strontium orthophosphate polyphosphate silicate hydrate, strontium aluminum polyphosphate hydrate, calcium aluminum polyphosphate hydrate, zinc calcium strontium orthophosphate silicate hydrate, zinc borate orthophosphate hydrate, calcium hydrogen phosphate, barium borophosphate, strontium borophosphate, calcium borosilicate, barium phosphosilicate, strontium phosphosilicate, calcium phosphosilicate. Most preferred pigments include, aluminum triphosphate and synthetic silicone dioxide calcium-ion exchanged. Other suitable additives include, but are not limited to, barium salts of modified sulfonic acid, calcium salt of modified sulfonic acid, zinc salt of modified sulfonic acid, magnesium salt of modified sulfonic acid, and alkyl ammonium salt solution.

In addition to anti-corrosive pigments and additives, compositions in accordance with the invention may comprise inorganic and organic pigments, other fillers and extender pigments such as talc, barites, clay, silica, etc.

The coating compositions of the invention may be stored as such for prolonged periods at room temperature without gel formation or undesirable changes. They may be diluted, as required, to a suitable concentration and applied by conventional methods, for example, spraying or spread coating, and cured, for example, by exposure to ambient temperatures of from about 21.11° C. to 23.88° C. for a period of from about 1 hour to about 1 week, and preferably from about 1.5 to 2 hours before sanding or applying a top coat.

However, sandable films of the coating compositions of the invention comprising phosphated monomers may also be obtained upon exposure of the applied coating to temperatures in the range of from at least about 49° C., and more preferably up to about 60° C., for periods of from about 30 to 50 minutes, and preferably from about 30 to 40 minutes.

In order to further illustrate the invention and the advantages thereof, the following non-limiting examples are given.

EXAMPLES

Example 1

An acrylic polyol synthesized with phosphated monomer was prepared as follows:

| Ingredients | Ingredient | % BOTM |
|---|---|---|
| Kettle Charge | | |
| n-butyl acetate | 104.6 | |
| Monomer Mixture | | |
| Sipomer IBOMA[1] | 63.0 | 20.7 |
| Methyl Methacrylate | 45.0 | 14.7 |
| 2-hydroxyethyl methacrylate | 75.8 | 24.8 |
| Butyl acrylate | 58.4 − x | 19.1 − Y |
| Styrene | 63.0 | 20.7 |
| Sipomer PAM-200[2] | x | Y = x/305.2 |
| Total monomer | 305.2 | 100.0 |
| n-dodecyl mercaptane | 24.7 | 8.1 |
| Vazo 67[3] | 2.4 | 0.8 |
| Chaser solution | | |
| Vazo 67 | 1.2 | 0.4 |
| n-butyl acetate | 10.0 | |
| | 448.1 | |

[1] Isobornyl methacrylate commercially available from Rhodia as Sipomer IBOMA
[2] Phosphated monomer of the invention, commercially available from Rhodia Inc. as PAM 200.
[3] Substituted azonitrile compounds commercially available from Dupont as Vazo 67.

Theoretical values:
% solids: 75%; MW 2500
Equivalent weight: 524
Glass transition temperature: 56° C.

Procedure:
1. Heat the reactor to 122° C. while purging with nitrogen. Maintain N2 blanket throughout the run. Prepare the monomer solution, chaser solution, and initiator solution while heating the kettle.
2. At 122° C., feed the monomer solution and initiator solution over ~3 hours. Maintain the polymerization temperature at 122° C.
3. Hold for an additional 30 minutes after all the materials have been charged. Feed chaser solution in 30 minutes.
4. Hold the reaction temperature for another 2 hours. Cool the reactor to room temperature.

A coating composition according to the invention was prepared as follows by synthesizing about 4% by wt. phosphated monomer into acrylic polyol resin. Part A was taken on cleaned container and accurately weigh. Part B was made separately as per the calculated formula below. Part B was added to Part A and hand mixed with a metal spatula for 3-5 minutes. The resulting coating composition was applied with a spray gun on cold rolled steel panels as described in the examples below.

| Part A | |
|---|---|
| Acrylic Polyol containing 4% PAM 200[1] | 63.9 |
| Byk-204[2] | 0.45 |
| Byk-320[3] | 0.9 |
| Titanium Dioxide Dupont R-960[4] | 39.0 |
| Shieldex AC-5[5] | 19.5 |
| lmsil A-8[6] | 39.0 |
| Sparmite[7] | 33.6 |
| Mistron monomix talc[8] | 32.4 |
| 21.8% CAB 551-0.2[9] in MIBK | 6.54 |
| Butyl Acetate | 54 |
| Methyl Amyl Ketone | 27 |
| Methyl Isobutyl Ketone | 22 |
| Halox-630[10] | 3.6 |
| 1% Dabco T-12 in 2-4 Pentanedione[11] | 3.6 |
| Sub-total | 345.49 |
| Part B | |
| Tolonate HDT[12] | 18.95 |
| Butyl Acetate | 6.5 |
| Total | 370.94 |

[1]Phosphated monomer of the invention, commercially available from Rhodia Inc. as PAM 200.
[2]Solution of polycarboxylic acid salt of polyamine amides commercially available from Byk Chemie as Anti-Terra-204.
[3]Solution of a polyether modified poly-methyl-alkyl-siloxane commercially available from Byk Chemie as Byk-320.
[4]Rutile titanium dioxide pigment commercially available from DuPont Inc. as Dupont R-960.
[5]Synthetic, amorphous silicone dioxide calcium-ion exchanged commercially available from Grace Davison as Shieldex AC-5.
[6]Microcrystalline silica fillers in form of Quartz commercially available from Unimin Specialty Minerals Inc as lmsil A-8.
[7]Barium Sulfate extender pigment commercially available from Elementis Pigments as Sparmite.
[8]Hydrous Magnesium silicate commercially available from Luzenac America as Mistron Monomix.
[9]Cellulose Acetate Butyrate commercially available from Eastman Chemicals as CAB-551-0.2.
[10]Alkylammonium salt solution currently commercially available as Halox 630 from Halox Inc.
[11]Dibutyltindilaurate commercially available from Air Products as Dabco T-12.
[12]Hexamethylene Diisocyanate Trimer commercially available from Rhodia as Tolonate HDT.

Example 2

The coating of Example 1 was applied to cold rolled steel panels (Q-Panel,S-412 ( Ground finish one side). The cold rolled steel panels were first sanded with 80-grit sandpaper and cleaned with hexane to remove metal dust. Approximately 3.5 Mils DFT (Dry film thickness) of the coating of Example 1 was applied to each panel using conventional spray equipment and panels were allowed to dry at ambient temperature, followed by sanding with 200 grit sand paper and then with 400 grit sand paper for smooth finish. The sanded panels were again cleaned with hexane before application of a base coat. Dry film thickness was measured to ensure that the film build was about 3.5 Mils DFT. Two wet coats (approximately 0.86 Mils DFT) of automotive refinish Black base coat were then applied using conventional spray equipment. The basecoat was allowed to flash for 30 minutes, followed with the application of 2.15 Mils of a two-component polyurethane based automotive refinish Clear coat by conventional spray application equipment. The panels were allowed to air dry for seven days at ambient temperature [Delete-(65-70° F.)] (18.33° C.-21.11° C.) to cure prior to testing.

Example 3

Following preparation according to Example 2, panels were scribed then placed in a salt spray cabinet, where they were subjected to salt spray test per ASTM B 117 for 1000 hours. The panels were removed after 1000 hours in the salt spray cabinet and scrape with putty knife parallel to scribe to determine the amount of material easily lifted from the scribe area.

A pass rating refers to scribe creep of 3 mils or less along the edge of the scribe and Panels should also be free of blistering and rust spots upon completion of salt spray test per ASTM B 117.

The results for the Corrosion test as per ASTM B 117 showing creepage, rust and blisters are as follows:

Results:

Results of 1000 hours of salt spray application as per ASTM B 117 are as follows:

Scribe rust as per ASTM D1654: Rating 7 (Equals 1-2 mm mean Creepage from scribe)

Scribe blisters as per ASTM D714: Rating 10 (Equals none)

Blisters in Unscribed area per ASTM D714: Rating 10 (Equals none)

Rust in Unscribed area per ASTM D610: Rating 10 (Equals none)

Adhesion loss: Rating 9 (Equals very slight change)

The invention claimed is:

1. A composition comprising:
a high monoester content polyalkylene oxide (meth)acrylated polymerizable phosphate ester mixed with or synthesized into a film-forming polymer, and a cross-linking agent having functional groups selected from the group consisting of isocyanate groups, epoxy groups, acid groups, and amine groups.

2. The composition of claim 1 wherein said high monoester content polyalkylene oxide (meth) acrylated polymerizable phosphate ester comprises a polymerizable ester surfactant, or a salt thereof, having the formula:

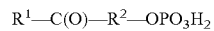

$R^1$—C(O)—$R^2$—OPO$_3$H$_2$ wherein:
$R^1$ an optionally substituted vinyl radical;
$R^2$ is a divalent polyoxyalkylene radical having at least two oxyalkylene units, and
wherein in the ester the mono-phosphate ester to di-phosphate ester weight ratio is greater than 80:20.

3. The composition of claim 2 wherein $R^1$ is selected from the group consisting of $CH_2$=CH—, $CH_2$=C(CH$_3$)—, or cis-CH(COOH)=CH—.

4. The composition of claim 2 wherein $R^2$ has about 2 to about 50 oxypropylene units.

5. The composition of claim 4 wherein $R^2$ has about 2 to about 20 oxypropylene units.

6. The composition of claim 4 wherein the molar ratio of oxypropylene units to oxyethylene units is at least 3:1.

7. The composition of claim 1 wherein said film-forming polymer comprises at least one functional group selected from the group consisting of hydroxyl, amine, carboxylic acid, epoxy, or mixtures thereof.

8. The composition of claim 1 wherein said film-forming polymer is selected from the group consisting of acrylic polymers, polyurethanes, polyesters, alkyds, polyamides, epoxy group containing polymers.

9. The composition of claim 1 wherein said film-forming polymer is difunctional and has an average functionality of from about two to about eight and an average molecular weight of from about 400 to about 10,000.

10. The composition of claim 1 wherein said film-forming polymer is selected from the group consisting of polyester polyols; polyether polyols; polyhydroxyl polyacrylates; polycarbonates containing hydroxyl groups; polyhydroxy polyacetals; polyhydroxy polyester amides; polythioethers containing terminal hydroxyl groups, sulphydryl groups, amino groups, thiol groups or carboxy groups; and mixtures thereof.

11. The composition of claim 1 wherein said film-forming polymer comprises an acrylic resin having a molecular weight of from about 500 to about 1,000,000.

12. The composition of claim 11 wherein said acrylic resin has a molecular weight of from about 1,000 to about 20,000.

13. The composition of claim 1 wherein said film-forming polymer is selected from the group consisting of polyester-modified acrylics or polyurethane-modified acrylics.

14. The composition of claim 1 wherein said cross-linking agent is an aliphatic or aromatic polyisocyanate.

15. The composition of claim 14 wherein said cross-linking agent is selected from the group consisting of aliphatic diisocyanates, ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate, 1,4-methylene bis-(cyclohexylisocyanate), isophorone diisocyanate, aromatic diisocyanates, toluene diisocyanate, meta-xylenediisocyanate, para-xylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate.

16. The composition of claim 14 wherein said cross-linking agent is selected from the group consisting of hexamethylene diisocyanate trimer, isocyanurates of hexamethylene diisocyanate trimer, biurets of hexamethylene diisocyanate trimer, and mixtures thereof.

17. A two-component coating composition comprising:
a) a film-forming component, wherein the film-forming component comprises a film-forming polymer synthesized with a polyalkylene oxide (meth) acrylate polymerizable phosphate ester, said phosphate ester having a mono-phosphate ester to di-phosphate ester weight ratio greater than 80:20; and
b) a cross-linking component, wherein said cross-linking component comprises a cross-linking agent having functional groups selected from the group consisting of isocyanate groups, epoxy groups, acid groups, and amine groups.

18. The composition of claim 17 wherein said film-forming polymer comprises functional groups selected from the group consisting of hydroxyl, amine, carboxylic acid, epoxy, and mixtures thereof.

19. The composition of claim 18 wherein said film-forming polymer is selected from the group consisting of acrylic polymers, polyurethanes, polyesters, alkyds, polyamides, epoxy group containing polymers.

20. The composition of claim 17 wherein said film-forming polymer is selected from the group consisting of polyester-modified acrylics or polyurethane-modified acrylics.

21. The composition of claim 18 wherein said film-forming component comprises additional film-forming polymers.

22. The composition of claim 17 wherein said phosphate ester comprises a polymerizable adhesion promoter, or a salt thereof, having the formula:

$$R^1-C(O)-R^2-OPO_3H_2$$

wherein:
$R^1$ is an optionally substituted vinyl radical, selected from the group consisting of $CH_2=CH-$, $CH_2=C(CH_3)-$, or cis-$CH(COOH)=CH-$; and
$R^2$ is a divalent polyoxyalkylene radical having from about 2 to about 50 oxyalkylene units.

23. The composition of claim 22 wherein $R^2$ has about 2 to about 20 oxypropylene units.

24. The composition of claim 22 wherein the molar ratio of oxypropylene units to oxyethylene units is at least 3:1.

25. The composition of claim 17 wherein said cross-linking agent is selected from the group consisting of aliphatic diisocyanates, ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate, 1,4-methylene bis-(cyclohexylisocyanate), isophorone diisocyanate, aromatic diisocyanates, toluene diisocyanate, meta-xylenediisocyanate, para-xylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, hexamethylene diisocyanate trimer, isocyanurates of hexamethylene diisocyanate trimer, biurets of hexamethylene diisocyanate trimer, and mixtures thereof.

26. The composition of claim 17 wherein at least one of said film-forming component or said cross-linking component further comprises one or more solvents.

27. The composition of claim 26 wherein said solvent is selected from the group consisting of benzene, toluene, xylene, ester, glycol ester, ketones, aromatic naphtha, ethyl acetate, butyl acetate, cellosolve, hexyl acetate, amyl acetate, ethyl proprionate, butyl proprionate, acetone, methyl amyl ketone, diisobutyl ketone, methyl ethyl ketone, methyl isopropyl ketone, methyl isobutyl ketone, diethyl ketone, and cyclohexanone, ethylene glycol, monoethyl ether acetate, and mixtures thereof.

28. The composition of claim 26 wherein said film-forming component comprises a solvent selected from the group consisting of ketones, methyl amyl ketone, methyl isobutyl ketone, and mixture thereof.

29. The composition of claim 26 wherein said cross-linking component comprises a solvent selected from the group consisting of butyl acetate, aromatic solvent mixtures, or mixtures thereof.

30. The composition of claim 17 further comprising one or more components selected from the group consisting of ultraviolet light stabilizers, antioxidants, catalysts, wetting and dispersing agents, carboxylic acid salts of polyamine amides, flow modifiers, polyether modified methylalkyl polysiloxane copolymer, adhesion promoters, pigments, dyes, leveling agents, corrosion inhibitors, barium salts of modified sulfonic acid, calcium salt of modified sulfonic acid, zinc salt of modified sulfonic acid, magnesium salt of modified sulfonic acid, and alkyl ammonium salt solution.

31. The composition of claim 30 wherein said pigments are selected from the group consisting of synthetic silicone dioxide calcium-ion exchanged, aluminum triphosphate, strontium zinc phosphosilicate, zinc phosphate, zinc oxide, zinc molybdate, zinc phospho-molybdate, calcium zinc molybdate, calcium zinc phospho-molybdate, zinc aluminum orthophosphate hydrate, zinc orthophosphate hydrate, zinc molybdenum orthophosphate hydrate, zinc calcium aluminum strontium orthophosphate polyphosphate silicate hydrate, strontium aluminum polyphosphate hydrate, calcium aluminum polyphosphate hydrate, zinc calcium strontium orthophosphate silicate hydrate, zinc borate orthophosphate hydrate, calcium hydrogen phosphate, barium borophosphate, strontium borophosphate, calcium borosilicate, barium phosphosilicate, strontium phosphosilicate, calcium phosphosilicate, and synthetic silicone dioxide.

32. A method of improving corrosion resistance in a multilayer coating system, comprising
  applying a primer coating composition directly to a metal substrate, said primer coating composition comprising the coating composition of claim 1.

33. A method of making a coating composition, said method comprising the steps of
  a) synthesizing a polymer with a polymerizable adhesion promoter, or a salt thereof, having the formula:

$R^1$—C(O)—$R^2$—$OPO_3H_2$ wherein $R^1$ is an optionally substituted vinyl radical, $R^2$ is a divalent polyoxyalkylene radical or a polyoxyalkylene in a block or random pattern, and wherein in the ester the mono-phosphate ester to di-phosphate ester weight ratio is greater than 80:20 to form a polymer containing polymerizable adhesion promoter;
  b) adding a cross-linking agent to said polymer containing polymerizable adhesion promoter, said cross-linking agent having functional groups selected from the group consisting of isocyanate groups, epoxy groups, acid groups, and amine groups;
  c) curing said cross-linking agent and said polymer containing polymerizable adhesion promoter to provide a cross-linked coating composition.

34. The method of claim 33 wherein said polymer containing polymerizable adhesion promoter is synthesized in a heated reactor.

35. The method of claim 34 wherein said heated reactor has a reactor temperature of at least about 100° C.

36. The method of claim 33 wherein said synthesis is performed at a reaction time of about 3 hours.

37. The method of claim 33 wherein said polymer is an acrylic polyol.

38. The method of claim 37 wherein said acrylic polyol is synthesized with from about 0.5% to about 10% by weight polymerizable adhesion promoter.

39. The method of claim 38 wherein said acrylic polyol is synthesized with about 4% by weight polymerizable adhesion promoter.

40. The method of claim 33 wherein said polymer containing polymerizable adhesion promoter forms a first component of a two-component protective coating composition for metal surfaces and said cross-linking agent forms a second component of said two-component composition.

41. The method of claim 40 wherein said first component and said second component are cured at temperatures of from about 15° C. to about 60° C.

42. The method of claim 34 wherein said heated reactor has a reactor temperature of about 100° C. to 122° C.

* * * * *